Patented Dec. 11, 1951

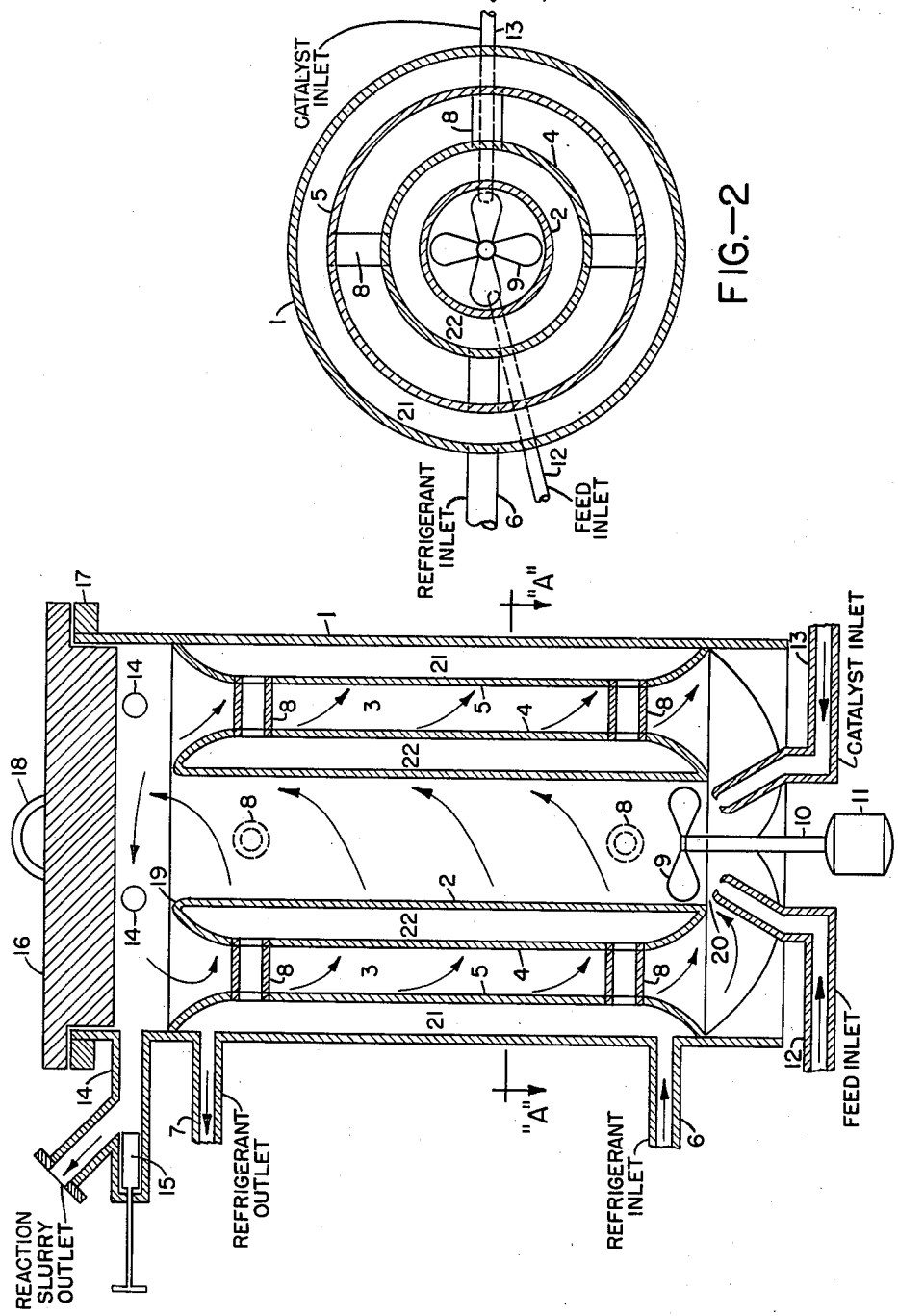

2,577,856

UNITED STATES PATENT OFFICE 2,577,856

POLYMERIZATION REACTION VESSEL

Joseph F. Nelson, Elizabeth, N. J., assignor to Standard Oil Development Company, a corporation of Delaware Application July 15, 1944, Serial No. 545,099

6 Claims. (Cl. 23—285)

The present invention pertains to the preparation of polymers from isomonoolefins or mixtures of isomonoolefins and diolefins by the treatment thereof with Friedel-Crafts type catalysts at low temperatures and in particular to a novel reactor which may be utilized for continuous operation of the foregoing polymerization reaction.

High molecular weight polymers such as polyisobutylene of 15,000–25,000 up to about 300,000 molecular weight (as determined by the Staudinger method) have been prepared by polymerizing isomonoolefins such as isobutylene in contact with a Friedel-Crafts type catalyst at temperatures below −10° C. and preferably below −40° C. Products which are vulcanizable or curable with sulfur are obtained if a minor proportion of a diolefin is added to a major proportion of an isomonoolefin and the resultant mixture is polymerized at temperatures below −10° C. and preferably at or about −100° C. by the application thereto of a solution of a Friedel-Crafts type catalyst in a low-freezing, non-complex forming solvent such as a lower alkyl halide, carbon disulfide or the like. These polymerizations have been carried out batchwise and continuously and with liquefied ethylene added to the reaction mixture as a diluent-refrigerant or in the presence of substantial amounts of alkyl halides and the like as diluents in apparatus provided with means for absorbing the exothermic heat of reaction. By and large the latter has been found to be the preferred method of conducting the polymerization since it not only lends itself well to continuous operation but is capable of better control with the formation of polymers of improved physical characteristics in greater yields. A reactor of this type is disclosed and claimed in application Serial No. 448,575, filed June 26, 1942, now abandoned, by John H. Bannon. In this reactor a draft tube provided with an agitator is arranged centrally of the reactor and a plurality of return tubes are arranged between headers arranged around the central draft tube with means for circulating a suitable refrigerant, desirably ethylene through the space between the headers and around the central draft tube as well as the return tubes. This type of reactor has been used extensively for this type of reaction since a maximum amount of heat transfer surface can be obtained in this way in a reactor of a given height and volume. A serious problem encountered with this reactor is that of accumulation of polymer on the upper entrance tube sheet and plugging of the return tubes, especially at their entrance ends. The exact cause of this trouble has never been determined but it has been general and persistent under widely varying conditions of operation.

It is the object of this invention to provide the art with a novel type of reactor.

It is a further object of this invention to provide the art with a polymerization reactor of the indirect heat exchange type which is relatively free of tendencies to plug.

It is also the object of this invention to provide the art with a reactor of the heat exchange type in which the reaction mixture is recirculated in highly agitated and turbulent flow.

It is a further object of this invention to provide the art with polymerization reactors having an improved heat transfer coefficient.

These and other objects will appear more clearly from the detailed description and claims which follow.

It has now been found that a polymerization reactor which is practically free from tendencies to plug and which possesses a high heat transfer coefficient is obtained if the reactor is constructed with a central draft tube provided with an impeller and a return tube made in the form of an annular passageway completely surrounding the draft tube and provision is made for maintaining a refrigerant in contact with each of the wall surfaces with which the reaction mixture comes into contact. Under the impetus of the impeller or agitator the reaction mixture moves upwardly through the central draft tube as a swirling, turbulent stream and since there are no obstructions in the return passageway other than a few crossover members for supplying refrigerant to the space between the central draft tube and the inner wall of the annular return passageway the return flow through the annular passageway is substantially as swirling and turbulent as that in the central draft tube. The reaction mixture follows a generally helical course upwardly in the central draft tube and also downwardly in the return annular channel, thereby substantially increasing the amount of contact of the reaction mixture with the cooling surfaces, this flow contributing to the high heat transfer coefficient of the reactor in accordance with the present invention. While the flow is indicated as being upwardly in the central draft tube and downwardly in the return annulus it will be understood that the direction of flow could just as well be downwardly in the central draft tube and upwardly in the return annulus.

Reference is made to the accompanying drawing which illustrates the reactor of the present invention.

Figure 1 is a vertical cross-section of the polymerization reactor, and

Figure 2 is a horizontal cross-section of the reactor along the line A—A of Figure 1.

Referring to the drawings, the reactor comprises an outer shell member 1 within which are arranged a central draft tube 2 and an annular return passageway 3 formed by inner cylindrical wall 4 and an outer cylindrical wall 5. In order to remove the exothermic heat of reaction a refrigerant is supplied to an outer cooling jacket 21 comprising the space between the outer shell member 1 and the cylindrical wall 5 and also to an inner cooling jacket 22 comprising the space between the inner wall member 4 and the central draft tube 2. The refrigerant is supplied to the recator through inlet 6 and is withdrawn, generally in vaporized form, through the outlet 7. A plurality of crossovers 8 are arranged to carry the refrigerant across the annular passageway into the inner cooling jacket 22. In order to reduce the number of obstructions in the circulating reaction mixture stream, the crossover members 8 are preferably made of sufficient size and strength and are attached to wall members 4 and 5 sufficiently securely as by welding to support the entire wall 4 and central draft tube 2 assembly.

A propeller-agitator 9 of any desired type is arranged at the bottom of the central draft tube 2 and is attached to drive shaft 10 connected to a suitable source of power such as a motor 11.

A feed inlet 12 for the supply of isoolefin or isoolefin-diolefin mixtures and diluent is arranged at the bottom of the reactor with the discharge end of the inlet member in fairly close proximity to the agitator 9 in order to obtain prompt and uniform distribution of the fresh feed into the contents of the reactor. A similar inlet 13 is also provided for the supply of catalyst solution to a zone of relatively high turbulence in the reactor. Outlet ports 14 are arranged at the upper portion of the reactor to permit withdrawal of reaction slurry from the reactor. Valves 15, preferably of the plunger or piston type, are arranged in the outlet ports in order to control the outflow from the reactor. Piston type valves are preferred since they are self-cleaning and lie flush with the inside wall of the reactor when closed.

The top of the reactor is closed by means of a head 16 which rests upon lugs 17 on the reactor shell and is secured in place during operation by bolts or any suitable clamping arrangement which permits ready removal of the head for inspection or cleaning of the reactor. Lifting lugs 18 are provided on the head 16 for convenience in removing the head.

The method of operation of the reactor in accordance with the present invention is substantially as follows: The reactor is filled with reaction mixture, preferably precooled, comprising a diluent such as methyl chloride and isoolefin such as isobutylene or mixtures of isobutylene and a diolefin such as butadiene. A refrigerant, preferably liquid ethylene, is introduced into the outer cooling jacket 21 and through crossovers 8 into the inner cooling jacket 22. The pressure on the ethylene is about atmospheric, at which pressure the boiling point of ethylene is about −150° F. The agitator 9 is placed in operation causing the reaction mixture to rise in the central draft tube and return through the annular passageway. Assuming counterclockwise rotation of the agitator the reaction stream rising in the central draft tube is given a rapid counterclockwise rotary or swirling movement which continues not only in the space at the top of the draft tube but in the return passageway 3 causing the reaction liquid to circle the inner jacket in passing from the central draft tube overflow 19 to the draft tube inlet zone 20.

When the reaction mixture has been cooled to the desired reaction temperature, a dilute solution of a Friedel-Crafts type catalyst in a low freezing non-complex forming solvent such as methyl-, ethyl- or propyl chloride or carbon disulfide precooled to about reaction temperature is introduced into the reaction mixture through catalyst inlet 13. The feed of fresh reaction mixture, desirably precooled to about reaction temperature and catalyst solution, are correlated in such a way as to give the desired degree of conversion in the reactor. Reaction mixture comprising a slurry of solid polymer particles in a mixture of unreacted olefinic materials and diluent continuously overflows the reactor through outlet port 14 and is passed either to suitable flashing equipment wherein the low boiling materials are vaporized, as by dropping the slurry into a heated flashing liquid, or to a filtering or screening device which will separate the polymer particles from the cold reaction liquid which is then suitable for immediate recycling to the reactor.

The present invention is applicable to the preparation of any solid, high molecular weight, low temperature polymerizates from isoolefinic hydrocarbons or from mixtures of isoolefinic hydrocarbons with a diolefinic compound capable of copolymerizing with isoolefinic materials at low temperatures in the presence of Friedel-Crafts type catalysts. The preferred isoolefin is isobutylene but other isoolefins containing up to about 8 carbon atoms per molecule may be used. The copolymerizable diolefinic materials include butadienes and substituted butadienes, especially isoprene, piperylene and dimethyl butadiene. Other polyolefinic materials containing up to 12 or 14 carbon atoms per molecule such as myrcene and certain non-conjugated diolefins, such as dimethylallene and the like, are also useful. The ratio of isoolefin to diolefin in the liquid is from about 50 to 99 weight per cent of isoolefin to about 50 to 1 weight per cent of diolefin when the latter is a $C_4$ diolefin. With $C_5$ and higher diolefins, the amount of diolefin is less than 10 weight per cent and preferably less than 5 weight per cent.

The catalyst used may be boron fluoride, either gaseous or in solution, or it may be a solution of a conventional Friedel-Crafts type catalyst such as aluminum chloride or the other materials listed on page 375 of the article on "Friedel-Crafts Synthesis" by N. O. Calloway, published in "Chemical Reviews," volume 17, No. 3 in 1935. For catalyst solvent, there may be used a mono- or polyhalogenated alkyl solvent containing less than 5 carbon atoms per molecule, carbon disulfide or the like. Diluents that may be used in the process include the alkyl halides containing less than 5 carbon atoms, preferably methyl chloride as well as hydrocarbons containing less than about 5 carbon atoms such as methane, ethane or ethylene.

There are certain conditions under which the polymer slurries are unstable and such conditions should be avoided in order to achieve the best results. Agglomeration of the polymer in the polymer slurry is favored by higher temperatures, lower molecular weight of the polymer, the use of diluents which tend to be mutually soluble with the polymer under the operating conditions, as well as the use of larger proportions of hydrocarbon reagents which are also mutually soluble with the polymer as well as excessive degree of dispersion of the catalyst.

Stable slurries of polybutenes can be produced at —90° C. with methyl chloride-isobutylene feeds by maintaining a volume ratio of methyl chloride to isobutylene over about 0.7:1 in the reaction mixture, with good agitation throughout the slurry (Reynolds numbers over about 5,000–6,000 and preferably over 10,000). At higher temperatures, higher diluent ratios are required up to temperatures of about —50° C. which is the approximate limit for high molecular weight polymer slurry. This temperature effect on molecular weight has been described by Thomas, Sparks, Frolich, Otto and Mueller-Cunradi in the "Journal of the American Chemical Society," vol. 62, page 276 (1940). As is also indicated in that article, impurities in the reaction mixture tend to lower the molecular weight and the lower the molecular weight of the polymer the higher the diluent ratio required to form a satisfactory slurry.

The same general principles apply to the production of low temperature isoolefin-diolefin copolymerizate slurries. The molecular weights of these polymers, as determined by the Staudinger method, are considerably lower than those of polybutenes prepared under otherwise similar conditions. This effect is attributable to the presence of diolefin in the reaction mixture. At —90° C., diluent ratios above 1:1 and preferably over 2:1 should obtain in the reaction zone. In the manufacture of these copolymers the reaction temperature should not exceed about —70° C. When using aluminum chloride-methyl chloride catalyst solutions, the concentration of aluminum chloride may be up to about 1 gram per 100 cc.

Low temperature isoolefin-diolefin copolymers of normal molecular weight for use as rubber substitutes, i. e., having a Staudinger molecular weight of about 30,000 and above can be maintained as a slurry provided that the per cent hydrocarbon or other mutual solvent is not too high. Thus when the reaction liquid contains 60–90 weight per cent of methyl chloride, the slurries containing polymer averaging over roughly 30,000 molecular weight are quite stable, but if the percentage of methyl chloride is reduced to about 30% the slurry becomes unstable and the polymer particles tend to agglomerate. With increasing diolefin content of the isoolefin-diolefin feed, the molecular weight of the resultant copolymer is lowered and the temperature necessary for the maintenance of a stable slurry is lowered. Increasing diluent ratio will also compensate, to a limited extent, for lower molecular weight of polymer, thereby permitting slurry formation.

The foregoing description contains a limited number of embodiments of the present invention but it will be understood that numerous variations are possible without departing from the purview of this invention as defined in the following claims.

What I claim and desire to secure by Letters Patent is:

1. An improved reactor vessel comprising a cylindrical shell, a cylindrical reaction conduit member concentrically of said shell, and having upper and lower ends terminating in vertically spaced relation to the top and bottom of said shell and with the side walls in radially spaced relation, an annular reaction conduit member, concentric with said cylindrical member and the shell, disposed between said cylindrical member and the shell sidewalls, in radially spaced relation to each, the upper and lower end portions of said annular member divergently flared into fluid tight union with the upper and lower ends of said cylindrical member and with the shell respectively, and forming therewith concentric annular chambers between the wall portions of said annular conduit and the walls of said shell and cylindrical conduit member respectively, separate means for introducing process materials into said shell and for removing a product therefrom, means for circulating said reactant materials through said shell and the conduit members, and conduit means communicating with said annular chambers to circulate a heat exchange medium therethrough.

2. An improved reactor vessel as described in claim 1 in which said conduit means for circulating a heat exchange medium through said annular chamber comprises an inlet and outlet for said medium, each opening through the shell, and a plurality of radially disposed conduit elements communicating between chambers.

3. An improved reactor vessel as described in claim 2 in which the radial conduit elements extend between chambers through said annular conduit in vertically spaced relation to each other and to the upper and lower ends thereof.

4. An improved reactor vessel comprising a cylindrical shell, a cylindrical reaction conduit member concentrically of said shell, and having upper and lower ends terminating in vertically spaced relation to the top and bottom of said shell and with the side walls in radially spaced relation, an annular reaction conduit member, concentric with said cylindrical member and the shell, disposed between said cylindrical member and the shell side walls, in radially spaced relation to each other, said annular conduit member including inner and outer wall portions, the upper and lower ends of which are divergently flared into fluid tight union with the upper and lower ends of said cylindrical member and with the shell respectively, and forming therewith concentric annular chambers between the wall portions of said annular conduit and the walls of said shell and cylindrical conduit member respectively, means for supporting and fixing the annular and cylindrical conduit member in relation to said shell, separate means for introducing process materials into said shell and for removing a product therefrom, means for circulating said reactant materials through said shell and the conduit members, and conduit means communicating with said annular chambers to circulate a heat exchange medium therethrough.

5. An improved reactor vessel as described in claim 4 in which said means for supporting and fixing the annular conduit member for circulating a heat exchange medium through said annular chamber, and comprises an inlet and outlet for said medium, each opening through the shell, and a plurality of radially disposed conduit elements communicating between chambers.

6. An improved reactor vessel comprising a cylindrical shell, a cylindrical upflow reaction conduit member concentrically of said shell, and having upper and lower ends terminating in vertically spaced relation to the top and bottom of said shell and with the side walls in radially spaced relation, an annular downflow reaction conduit member, concentric with said cylindrical member and the shell, disposed between said cylindrical member and the shell side walls, in radially spaced relation to each, the upper and lower end portions of said annular member divergently flared into fluid tight union with the upper and lower ends of said cylindrical member and with the shell respectively, and forming therewith concentric annular chambers between the wall portions of said annular conduit and the walls of said shell and cylindrical conduit member respectively, separate means for introducing process materials into said shell and for removing a product therefrom, means for circulating said reactant materials through said shell and the conduit members, and conduit means communicating with said annular chambers to circulate a heat exchange medium therethrough.

JOSEPH F. NELSON.

REFERENCES CITED

The following references are of record in the file of this patent:

UNITED STATES PATENTS

| Number | Name | Date |
| --- | --- | --- |
| 2,078,627 | Block et al. | Apr. 27, 1937 |
| 2,276,893 | Thomas | Mar. 17, 1942 |
| 2,317,878 | Bannon | Apr. 27, 1943 |
| 2,363,834 | Crater | Nov. 28, 1944 |
| 2,436,767 | Gerlicher | Feb. 24, 1948 |
| 2,474,592 | Palmer | June 28, 1949 |